R. D. KIMBALL.
PIPE SUPPORTING FRAME.
APPLICATION FILED FEB. 17, 1916.
1,220,343. Patented Mar. 27, 1917.
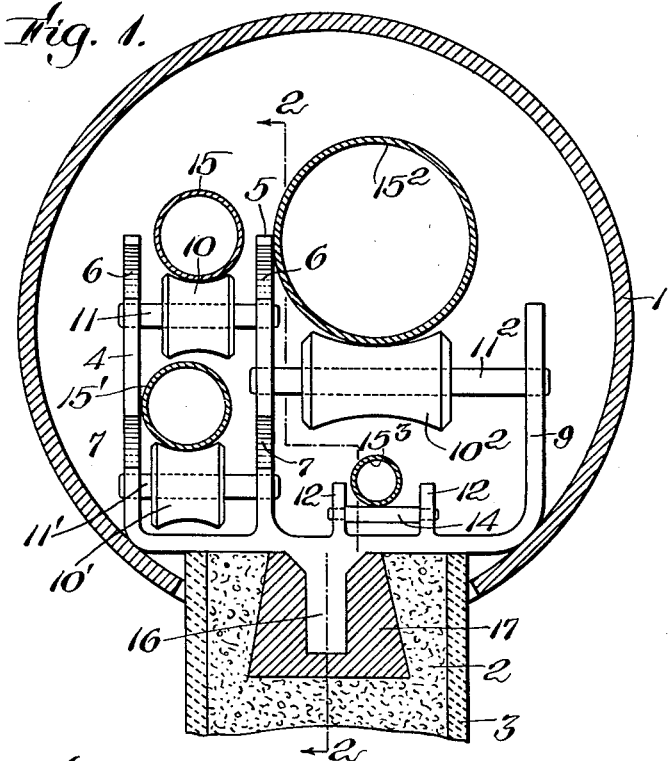
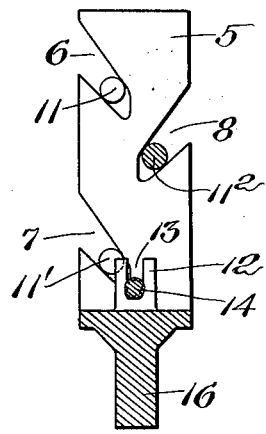
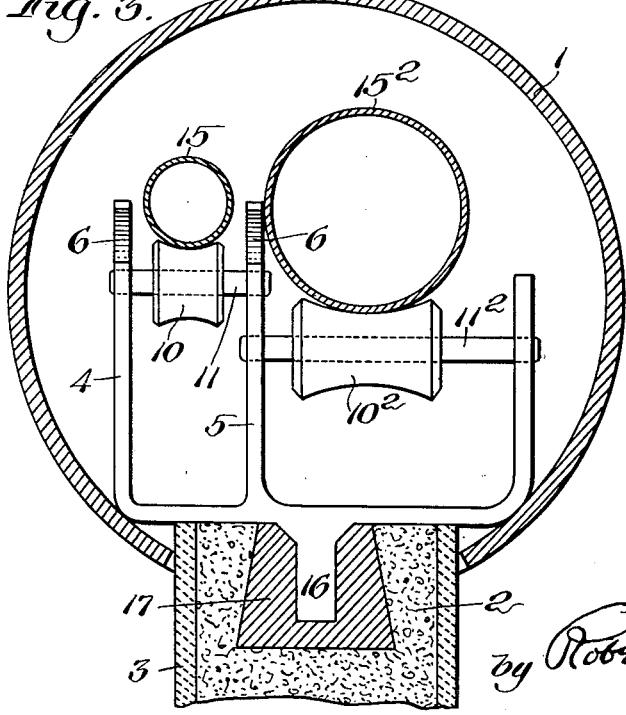
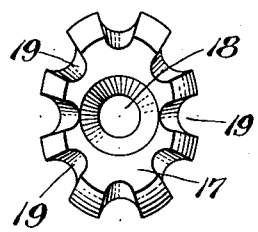
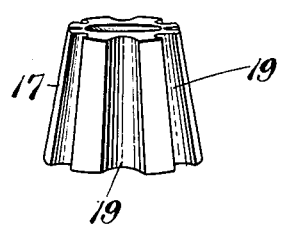
Inventor:
Richard D. Kimball,
by Roberts, Roberts & Cushman
Attorneys.

UNITED STATES PATENT OFFICE.

RICHARD D. KIMBALL, OF MEDFORD, MASSACHUSETTS.

PIPE-SUPPORTING FRAME.

1,220,343.  Specification of Letters Patent.  Patented Mar. 27, 1917.

Application filed February 17, 1916. Serial No. 78,985.

*To all whom it may concern:*

Be it known that I, RICHARD D. KIMBALL, a citizen of the United States, and resident of Medford, in the county of Middlesex and State of Massachusetts, have invented new and useful Improvements in Pipe-Supporting Frames, of which the following is a specification.

This invention relates to pipe supports, and more particularly to the roll-carrier frame or pipe-supporting frame, used in conduits of the general type shown in Letters Patent of the United States No. 1,149,920 issued to me August 10, 1915. Such conduits are usually made of earthenware conduit-sections and are used for protecting and insulating pipes conveying gases and liquids, and particularly for the distribution of a heating medium from a central heating plant to remote points.

Among the objects of the invention are the provision of a novel and improved pipe-supporting frame of the kind having a plurality of upwardly extending branches, upon which the pipe-carrier or carriers are mounted in notches formed in the branches so that the pipe carriers may be furnished separate from the frames and readily assembled or dismembered during the installation or repair of the device; the making of said notches of tapered or wedge-like form so that the pipe-carriers lodged therein, while readily separable, will be firmly held in place by a wedge-like action under the weight of the pipes; the provision of rollers for carrying the pipes, adapted both to rotate upon and to slide lengthwise of shafts lodged in said notches, thus permitting the pipes supported on the rollers to move freely, not only lengthwise as the pipes expand and contract under variations in temperature, but also sidewise to accommodate any lateral play of the pipes; also to provide a novel mounting for the pipe-supporting frame upon a base with which the pipe-supporting frame can be readily and quickly assembled even by unskilled persons, and which is rigid and durable. These and other features of improvement will be hereinafter more fully described and particularly pointed out in the claims.

In the accompanying drawings, which illustrate certain embodiments of the invention, Figure 1 shows a cross-section of a conduit and a pipe-supporting base or pedestal, the pipe-supporting frame being shown in side elevation;

Fig. 2 is a view of the pipe-supporting frame partly in elevation, and partly in section on line 2—2 of Fig. 1;

Fig. 3 is a view of a conduit and pipe-supporting frame similar to that shown in Fig. 1, containing a modified form of pipe-supporting frame;

Fig. 4 is a plan view of the base or socket member for holding said frame; and

Fig. 5 is a perspective view of said socket member.

Referring to the drawings, 1 represents the conduit in which the frame and the pipes carried thereby are located, and 2 represents a pedestal of concrete or the like, preferably confined by an upright tubular wall of earthenware 3, the whole extending upward into an aperture in the bottom of the conduit.

Referring to the form shown in Figs. 1 and 2, the pipe-supporting frame comprises a number of upwardly extending branches or arms, provided with notches arranged opposite to each other, in which are mounted the pipe-carriers between said branches. In the form now under consideration the two longer arms 4 and 5 are provided with the opposed notches 6, 6 and 7, 7 which enter one side of said branches, while a similar notch 8 enters the other side of the branch 5 opposite another like notch in branch 9. Each of these notches is preferably downwardly inclined from its mouth toward its inner end, and is also tapered toward its inner end, as best shown in Fig. 2.

The pipe-carriers, as herein shown, consist of rollers 10, 10', 10² mounted respectively on shafts 11, 11', and 11², and adapted both to rotate upon said shafts and to slide lengthwise thereof. The shaft 11 is lodged in the notches 6, 6, the shaft 11' is lodged in the notches 7, 7, and the shaft 11² is lodged in notch 8 of branch 5 and in a corresponding notch in branch 9. The rollers and shafts, constituting removable pipe-carriers, may thus be readily assembled when the apparatus is being installed, and may be as readily removed for the purpose of repair or otherwise, any such pipe-carrier being removable without disturbing the others. By reason of the downwardly extending tapered form of the notches, the shafts will be held in place under the weight of the pipes by a wedge-like action, so that when in use they are quite as secure as though they were permanently connected to the pipe-supporting frame. 12, 12, are a pair of short upwardly extending branches, each provided with a notch 13 extending downwardly from the top of the branch, in which is lodged a pipe-carrier consisting of a shaft or bar 14. As this pipe-carrier is intended to carry a small and relatively light pipe 15³, it may be used without a roller. The pipes supported by the other pipe-carriers are indicated at 15, 15', and 15².

The pipe carrying frame is provided with a downwardly extending shank 16 by which the pipe-supporting frame is mounted on its base. The base comprises a socket member 17 provided with a central vertical bore 18 to receive the shank 16. The socket member 17 is embedded in the concrete 2 to a depth substantially flush with the top surface of the concrete, and is provided with exterior flutings or corrugations 19 which effectually prevent the socket member from turning or working loose when embedded in the concrete. The socket member is also preferably tapered in form from its bottom toward its top to afford a broad base on which the weight rests and as further security against the socket member becoming loose or being pulled out.

The foregoing description applies also to the construction shown in Fig. 3, save that pipes 15' and 15³, and their corresponding pipe-carrier devices are omitted, this form of frame being designed for supporting only two pipes.

Said branches (4, 5, 9) might be strengthened, if desired, by forming the slots or notches 6, 7, 8, etc., with closed upper ends instead of open ends, in which case the roll-shafts would be put in by first inserting one end into its notch endwise and then the other. Throughout the specification and claims I use the word notch to designate the openings for receiving pipe carriers, whether such openings are closed or open at their upper ends, unless otherwise expressly limited.

I claim:

1. A pipe-supporting frame comprising upwardly extending branches provided with opposed notches extending in a downward direction into the branches and tapering toward their lower ends, and a pipe carrying shaft wedged into and supported by said tapering notches.

2. A pipe-supporting frame comprising upwardly extending branches provided with opposed notches extending in a downward direction into the branches and tapering toward their lower ends, a pipe-carrying shaft wedged into and supported by said tapering notches, and a roller mounted on said shaft.

3. A pipe-supporting frame comprising upwardly extending branches provided with opposed notches extending in a downward direction into the branches and tapering toward their lower ends, a pipe-carrying shaft wedged into and supported by said tapering notches, and a roller mounted on said shaft adapted both to rotate upon and to slide lengthwise of said shaft.

4. A pipe-supporting frame comprising upwardly extending branches provided with opposed notches entering through the sides of said branches, said notches being inclined downwardly, and tapering toward their lower ends, and a pipe-carrying shaft wedged into and supported by said inclined tapering notches.

5. A pipe-supporting frame comprising upwardly extending branches provided with a number of pairs of opposed notches, entering through opposite sides of the branches, said notches being inclined downwardly, and tapering toward their lower ends.

6. A pipe-supporting frame comprising upwardly extending branches and a downwardly extending shank, and a socket member on which said frame is mounted provided with a bore tightly to receive said shank.

7. A pipe-supporting frame comprising upwardly extending branches and a downwardly extending shank, and a socket member on which said frame is mounted provided with exterior flutings and a bore tightly to receive said shank.

8. A pipe-supporting frame comprising upwardly extending branches and a downwardly extending shank, and a socket member on which said frame is mounted provided with a bore tightly to receive said shank, said socket member being tapered in form from its bottom toward its top.

9. A pipe-supporting frame comprising upwardly extending branches and a downwardly extending shank, and a socket member on which said frame is mounted provided with a bore tightly to receive said shank, said socket member being tapered in form from its bottom toward its top, and provided with flutings extending lengthwise of its tapered surface.

10. A pipe-support for conduits comprising a concrete pedestal, a socket member embedded in the top of said pedestal and provided with a vertical bore, and a frame having upwardly extending branches and a downwardly extending shaft tightly mounted in said bore.

Signed at Boston, Massachusetts, this 14th day of February, 1916.

RICHARD D. KIMBALL.